April 8, 1952     A. J. SEEGERS ET AL     2,591,970
HAY FEED CUTOFF FOR BALING MACHINES
Filed April 6, 1949
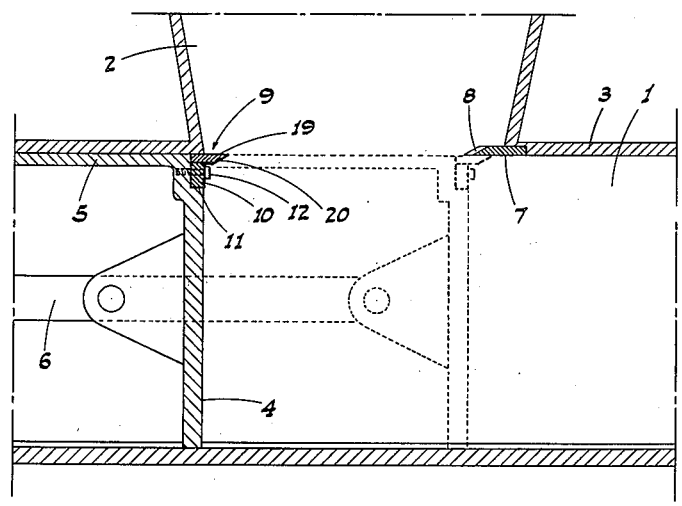
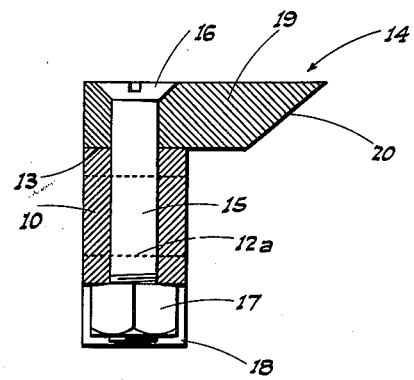
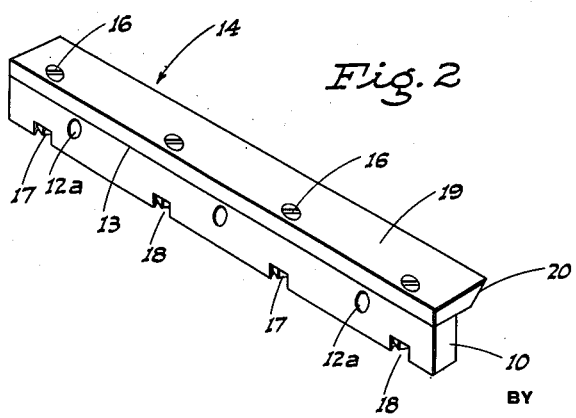
INVENTORS
A. J. Seegers
L. G. Seegers
BY
ATTORNEYS Patented Apr. 8, 1952

2,591,970

UNITED STATES PATENT OFFICE 2,591,970

HAY FEED CUTOFF FOR BALING MACHINES

Arthur J. Seegers and Lawrence G. Seegers, French Camp, Calif., assignors of one-half to Jesse A. Priest, French Camp, Calif.

Application April 6, 1949, Serial No. 85,844

1 Claim. (Cl. 100—25)

The present invention is directed to, and it is an object to provide, a novel cut-off knife assembly for hay as feed into a baling machine; the knife assembly being operative, upon each advance of the baling plunger, to effectively and cleanly sever the plunger advanced hay from that which remains in the hay feed opening.

Another object of the invention is to provide a hay cut-off knife assembly which includes a pair of cooperating bevel sharpened knives; one being mounted in a stationary position along the forward transverse edge of the hay feed opening in the baling chamber, and the other being mounted on the plunger along the edge thereof adjacent said hay feed opening, whereby with each advancing stroke of the plunger said knives cooperate in hay cut-off relation.

A further object of the invention is to provide a novel mount for the knife which is secured to the plunger; such mount being readily detachable from the plunger for sharpening or replacement of said knife.

An additional object of the invention is to provide a hay feed cut-off knife assembly which is designed for ease and economy of manufacture.

A further object of the invention is to provide a practical and reliable hay feed cut-off knife assembly, and one which will be exceedingly effective for the purpose for which it is designed.

These objects are accomplished by means of such structure and relative arrangement of parts as will fully appear by a perusal of the following specification and claim.

In the drawings:

Fig. 1 is a somewhat diagrammatic sectional elevation of the baling chamber and plunger, of a hay baling machine, fitted with the present invention.

Fig. 2 is a perspective view, detached, of the transverse knife bar, and its mount, for the plunger.

Fig. 3 is an enlarged cross section of the knife bar and mount shown in Fig. 2.

Referring now more particularly to the characters of reference on the drawings, the hay feed cut-off, to which the present invention is directed, is adapted to be embodied in a hay baling machine which includes a baling chamber, indicated generally at 1; said baling chamber having a hay feed opening 2 in the top 3 of said chamber.

A vertically disposed plunger 4 is mounted for reciprocation in the baling chamber 1 through a path across the hay feed opening 2; the starting position of the plunger 1 being shown in full lines in Fig. 1, and its advanced position being shown in dotted lines in said figure.

The plunger 4 includes a top plate 5 which runs in face to face engagement with the under side of the adjacent portion of the top 3 of the baling chamber, and said plunger is adapted to be power reciprocated by means including a connecting rod 6.

The above is a generally conventional baling chamber and plunger arrangement. The present invention is a knife assembly comprised of the following:

One transverse knife 7 is mounted in connection with the top 3 of the baling chamber 1 in a position extending along the forward edge of the hay feed opening 2; the knife 7 being of substantial width and disposed with its lower surface substantially flush with the inner face of the top 3.

The outer or free edge portion of the knife 7 is bevel sharpened, as at 8, with the bevel facing outward.

A separate, transverse knife unit, indicated generally at 9, is detachably mounted in connection with the plunger along the upper edge thereof; i. e. the edge which is adjacent the feed opening 2. The knife unit 9 is constructed and mounted as follows:

The numeral 10 indicates a rigid, transverse mounting bar which is rectangular in cross section. This mounting bar is detachably secured in a rectangular notch 11 in the plunger by means of bolts 12; said bolts extending through bolt holes 12a. The mounting bar 10 is disposed in a position with the outer edge 13 thereof short of the upper edge or top of said plunger.

A generally flat, transverse knife bar 14 rests in matching relation on the upper or outer edge 13 of the mounting bar 10; the knife bar 14 being secured to said mounting bar 10 by vertical bolts 15 which extend therethrough. At their upper ends the bolts 15 include flat heads 16 countersunk flush in the knife bar 14. At their lower ends the bolts 15 are fitted with nuts 17 disposed in nut receiving notches 18 in the lower edge portion of the mounting bar 10. The notches 18 are of a size to receive the nuts 17 but to prevent rotation thereof. With this arrangement there is little, if any, tendency of the bolts 15 to loosen when the device is in operation, and additionally the countersunk heads 16 are not subject to any material wear.

The transverse knife bar 14 is of considerably greater width than the thickness of the mounting bar 10 lengthwise of the direction of travel of the plunger, whereby said knife bar 14 includes a forwardly projecting portion which forms a transversely extending knife 19 bevel sharpened, as at 20, with the bevel facing inwardly.

With the above described knife unit 9 mounted in connection with the plunger 4 in the notch 11, the upper or outer surface of the knife 19 is flush with the corresponding surface of the top plate 5 of said plunger. The knives 7 and 19 are thus disposed for close cooperating shearing action upon advance of the plunger 4 from its full line position to its dotted line position of Fig. 1. When this occurs said knives 7 and 19 effectively shear or cut the plunger advanced hay from the hay which remains in the feed opening 2; this being very desirable in connection with baling machines of the type which function to produce separable layers or bunches of hay in the bales.

By reason of the detachable mounting means for the knife unit 9 the latter can be easily initially installed on the plunger 14, and subsequently can be readily removed for sharpening or replacement.

The described hay feed cut-off knife assembly provides a very advantageous device in baling machines of the type described; yet such device is relatively simple in structure and designed for ease and economy of manufacture.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desirable:

A knife unit for the plunger of a hay baler comprising a rigid mounting bar adapted to be disposed against the forward face of the plunger, a knife bar resting on the top edge of the mounting bar and projecting ahead of the same with its back edge flush with the back side of the mounting bar, bolts extending vertically through the bars, said bolts having flat screw heads turnably countersunk in the knife bar, and nuts on the lower end of the bolts seated in non-turning relation in transverse notches in the lower edge of the mounting bar, the latter having transverse bolt holes intermediate the vertical bolts to receive bolts for securing the mounting bar on the plunger in position so that the top of the knife bar is flush with the top of the plunger.

ARTHUR J. SEEGERS.
LAWRENCE G. SEEGERS.

REFERENCES CITED

The following references are of record in the file of this patent:

UNITED STATES PATENTS

| Number | Name | Date |
|---|---|---|
| 407,861 | Hamilton | July 30, 1889 |
| 996,140 | Reynolds | June 27, 1911 |
| 1,009,232 | Foster | Nov. 21, 1911 |
| 2,294,440 | Barker | Sept. 1, 1942 |
| 2,396,720 | Nolt | Mar. 19, 1946 |
| 2,428,672 | McClellan | Oct. 7, 1947 |
| 2,441,374 | Robb | May 11, 1948 |

FOREIGN PATENTS

| Number | Country | Date |
|---|---|---|
| 525,349 | Germany | May 22, 1931 |